United States Patent [19]

Snell

[11] Patent Number: 5,238,584
[45] Date of Patent: Aug. 24, 1993

[54] APPARATUS FOR REMOVING FILTRATE FROM FILTER MEDIA

[75] Inventor: Darrell E. Snell, Vallejo, Calif.

[73] Assignee: J. R. Schneider Co., Inc., Benecia, Calif.

[21] Appl. No.: 826,721

[22] Filed: Jan. 28, 1992

[51] Int. Cl.⁵ .......................................... B01D 33/58
[52] U.S. Cl. ................................... 210/769; 210/387; 210/396; 210/780
[58] Field of Search ............... 210/225, 387, 396, 400, 210/407, 769, 791, 386, 780; 209/307, 308

[56] References Cited

U.S. PATENT DOCUMENTS

| | | | |
|---|---|---|---|
| 672,981 | 4/1901 | Jessup | 209/308 |
| 2,546,713 | 3/1951 | Baldwin | 209/308 |
| 2,867,325 | 9/1955 | Hirs | 210/97 |
| 2,867,326 | 9/1955 | Hirs | 210/104 |
| 3,508,734 | 9/1971 | Schneider | 210/387 |
| 3,608,734 | 9/1971 | Schneider | 210/387 |
| 3,655,055 | 4/1972 | Van Egoom et al. | 210/225 |
| 3,984,329 | 10/1976 | Wenzel et al. | 210/396 |
| 4,289,615 | 9/1981 | Schneider et al. | 210/386 |
| 4,389,315 | 6/1983 | Crocket | 210/387 |
| 4,477,350 | 10/1984 | Brandt et al. | 210/387 |
| 4,602,998 | 7/1986 | Goron | 210/396 |
| 4,609,467 | 9/1986 | Morales | 210/396 |
| 4,729,836 | 3/1988 | Ickinger et al. | 210/396 |
| 4,738,775 | 4/1988 | Schnieder | 210/387 |
| 4,857,193 | 8/1989 | Clements et al. | 210/396 |
| 4,869,834 | 9/1989 | Hudson | 210/387 |
| 4,976,054 | 12/1990 | Jones | 172/829 |
| 4,986,911 | 1/1991 | Goron et al. | 210/396 |

Primary Examiner—Joseph W. Drodge
Attorney, Agent, or Firm—Townsend and Townsend, Khourie and Crew

[57] ABSTRACT

An apparatus for separating filter cake from an endless filter web, and method for using the same, for use in conjunction with a stacked plate filter system and filter web extractor. The filter cake and filter web separator apparatus includes a downwardly sloping support tray and a wedge-shaped plow blade having a resilient scrapper and suspended above, and generally parallel with, the support tray. As contaminated filter web exits a plate filter and is pulled through the separator apparatus by the filter web extractor, the resilient scrapper dislodges the filter cake from the filter web as the contaminated portion of filter web passes between the plow blade and the support plate and displaces the cake off the filter web where it falls into a suitable collection container. The filter web exits the apparatus from between the plow blade and support tray having substantially all of the filter cake removed from the filter web. In one embodiment of the invention, a suitable vacuum inlet can be disposed downstream of the plow blade to remove any residual moisture or particulate matter disposed on the filter web. Adjustment components are provided to allow height and inclination adjustment of the plow blade relative to the support tray and separation of the two components to facilitate threading of a filter web through the apparatus.

14 Claims, 3 Drawing Sheets

APPARATUS FOR REMOVING FILTRATE FROM FILTER MEDIA

BACKGROUND OF THE INVENTION

The invention generally relates to a method and apparatus for the separation of caked filtrate from a filter media used in plate filter systems. More specifically, the invention relates to the removal of filtrate accumulated on an elongated or continuous filter web used in horizontal plate filter systems.

Plate-type industrial liquid filters are used to filter recycling liquids such as lubricants, cleansers or other materials in various machining or other mechanical operations. Several plate filters are usually stacked vertically to handle large volumes of industrial liquids for filtering. Each plate filter includes an upper chamber and lower chamber with a portion of filter web disposed therebetween. Liquid is introduced into the upper chamber and filtered by the filter web as the liquid passes into the lower chamber. As filtrate accumulates on the filter web, the filter web becomes contaminated and must be replaced by fresh filter web.

The filter web, an elongated sheet of filter media such as polyester, paper or the like, is supplied on rolls and can be advanced through the plate filter in incremental steps each time contamination of a portion necessitates fresh filter media. To advance the filter web, the upper and lower chambers are separated thereby releasing the portion of the sheet of filter web between the plates so that a filter web extractor located downstream can pull the filter media through the plate filter until a fresh portion is advanced between the upper and lower chambers. The upper and lower chambers are then closed together on the fresh filter web and the filtering continues.

As fresh filler web is advanced into the plate filters, the contaminated portion of the web is pulled out. The filter web exits the plate filter with considerable filtrate disposed upon its upper surface forming a filter cake. Many environmental restrictions warrant the separation of the filter media and filter cake before disposal.

Conventionally, separation of the filter cake from the filter web is done by hand. Once the contaminated filter web is extracted from the system, the filter web is cut up and deposited into a collection receptacle. An operator is required to pull the elongated sheets of filter media web out of the collection receptacle, sometimes called a debris box, and manually dislodge the caked filtrate from the filter media. The filter web is commonly provided in rolled sheets approximately 41 inches wide. During the filtering process, hundreds of pounds of filtrate, such as diatomaceous earth, Fuller's earth with oil, or other particulate matter, can accumulate on a sheet of filter web. As a result, manual separation of the heavy filtrate cake from the filter web is physically dangerous to the operator and extremely time consuming.

In a effort to improve the process, mechanical means for separation of filtrate cake from filter media in plate filter systems have been developed. One example is the apparatus disclosed in U.S. Pat. No. 4,869,834 to Hudson. This patent discloses a method and device having a driven rewind spindle that pulls filter paper media and filtrate cake from the plate filter chambers around a cylindrical bar fixed at a position of 45° to the filter paper travel path. As the filter media bends around this cylindrical bar, the filtrate cake is dislodged from the filter media and falls into a collection container. The filter media, now upside down after bending around the cylindrical bar, is rolled upon a rewind mechanism. When the rewinder is full, the paper media is either unwound or cut off. This device is disadvantageous for several reasons. The travel of the contaminated filter media around the cylindrical bar compromises the alignment of the filter media through the mechanism. Constant supervision of the operation of the apparatus is required to assure proper alignment and to make necessary adjustments. Additionally, some filtrate may fail to dislodge from the filter media as the media is inverted. Furthermore, as the filter media is wound up at the end of the travel path, the rewinding or manual cutting of the paper media is time consuming especially in systems with multiple stacked plate filter chambers in a vertical arrangement.

SUMMARY OF THE INVENTION

The present invention relates to a method and apparatus for removing filter cake from filter web used in stacked plate filter systems. The filter web can be a finite length or an "endless" recycling band of material. The apparatus includes a plow blade disposed above a support tray, the support tray being inclined with the upstream end higher than the downstream end. The filter web is threaded between the plow blade and the support tray which are positioned in the filter web travel path. As the filter web passes through the apparatus, the plow blade dislodges the filter cake from the filter web and displaces it off the side of the filter web travel path. Multiple support tray and plow blade pairs can be stacked vertically as necessary to coincide with the number of filter webs used in the particular stacked plate filter system.

In the preferred embodiment, the plow blade and the support tray are adjustably mounted onto a support frame. The support frame is positioned between conventional plate filter stacks and a suitable filter web extractor along the filter web path in a generally linear fashion. The filter web exiting the plate filter is threaded between the support tray and plow blade where and engaged with the filter web extractor which pulls the filter web in the upstream to downstream direction through the filter system. The plow blade in the preferred embodiment includes two blade legs configured in a generally wedge-shaped configuration. The pointed end of the wedge constitutes the upstream end of the plow blade. The plow blade also includes a resilient scrapper extending towards the support tray and is suspended above the support tray generally parallel to the inclination of the support tray. Height adjustment means are provided for adjusting the elevation of the plow blade relative to support tray.

In operation, contaminated filter web exiting the plate filter is pulled across the inclined support tray from the upstream end to the downstream end between the support tray and plow blade. The height and inclination of the plow blade is adjusted so that the spacing between the support tray and resilient scrapper is slightly greater than the thickness of the filter web. As such, the filter cake, disposed on the plow blade side of the filter web, is dislodged from the filter web as the filter web is pulled between the resilient scrapper and support tray. The wedge configuration of the plow blade and the inclination of the support tray combine to displace the dislodged filter cake to the sides of the support tray and off the filter web where it drops away from the support tray into a suitable receptacle such as a debris box. As the filter web then exits between the plow blade and the support tray from the downstream end of the support tray, the filter web and filter cake have been separated and substantially all of the filter cake removed from that portion of the filter web. The filter web then continues its travel path, pulled by the downstream paper web extractor, and is disposed into a suitable collection container.

The invention offers a simple, easy to maintain and low cost apparatus for separation of filter cake from a filter media in plate filter systems. The simplistic construction allows low-cost manufacture and high reliability. Because the separator apparatus is disposed along the filter web path without altering the direction of the path, alignment problems are nearly eliminated. The apparatus also provides means for easily separating the plow blade and support tray to facilitate threading of the filter web through the separator apparatus when necessary. These, and other features and advantages of the invention will become more apparent from the detailed description below in conjunction with the accompanying drawing.

DESCRIPTION OF THE PREFERRED EMBODIMENT

Figure 1:
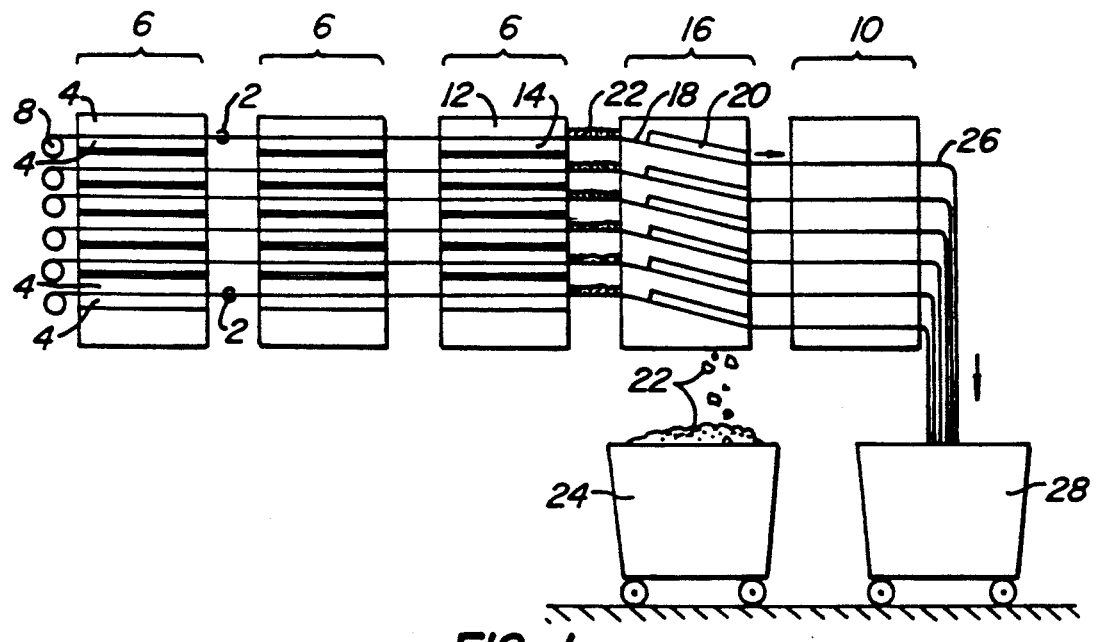
FIG. 1 is a simplified schematic view of the invention shown used in a typical plate filter system with a filter web extractor.

The invention is intended to be used in industrial plate filter systems using an elongated sheet of filter web or "endless" filter web. The filter web, sometimes referred to as "filter paper", is threaded through the plate filters and advanced away from the plate filters along a filter web path by a filter web extractor when contamination of the portion of filter web in the plate filters necessitates replacement with a portion of clean filter web. A general schematic of such a system is illustrated in FIG. 1 showing the invention deployed in a typical plate-type industrial liquid filter system. In the system illustrated, a filter web 2 is pulled off a filter web supply roll 8 and is passed between filter plates 4 of one or more filter stacks 6 and threaded into filter extractor 10. Filter web 2 is then incrementally pulled through the filter stacks 6 from filter web supply roll 8 by filter web extractor 10. Filter web extractor 10 is a pin-type extractor disclosed in U.S. Pat. No. 4,738,775, herein incorporated by reference, or suitable alternative. Filter web extractor 10 pulls filter web 2 through the system.

Multiple plate filters 4 are typically stacked vertically to provide filtering of large volumes of industrial liquid such as lubricants, cleansers and the like. In these systems, the liquid to be filtered is directed from a main input conduit (not shown) into a series of intake plate chambers 12 each disposed above a filter web 2. The liquid passes from intake chamber 12 through filter web 2 where it exits through exit plate chamber 14. As the liquid passes from intake chamber 12 to exit chamber 14, filtrate, or particulate matter, collects on filter web 2 which is sealed between the adjacent plates chambers. The exiting filtered liquid is then recycled back to the particular process where it again accumulates particulate matter.

When sufficient filtrate collects upon filter web 2, it becomes contaminated thereby reducing the effectiveness of the filtering system. When this occurs, the filter web 2 must be advanced such that the contaminated portion is pulled out from the filter stack 6 and fresh filter web 2 is advanced into that position by the filter web extractor 10.

The inventive apparatus, here generally referred to as filter web and filter cake extractor apparatus 16, is positioned along the filter web path preferably between the filter stacks 6 and the filter web extractor 10. Separator apparatus 16 generally includes a support tray 18 and corresponding plow blade 20 for each filter web path. Synchronized advancement of filter web 2 through the system is accomplished by first separating intake chamber 12 from output chamber 14 and thereby releasing filter web 2. Once freed from between the chambers, filter web 2 is pulled by filter web extractor 10 through separator apparatus 16. As previously described, filter web 2 is threaded through separator apparatus 16 between plow blade 20 and support tray 18. Plow blade 20 is suspended above support tray 18 and extends substantially across the width of support tray 18. As filter web 2 passes therebetween, the filter cake 22 is blocked by plow blade 20 while filter web 2 is allowed to pass downstream. As the filter cake 22 is scrapped off filter web 2, the angular orientation of plow blade 20 relative to the filter web path causes filter cake 22 to be displaced to the side of support tray 18. This displacement is aided by gravity because plow blade 20 and support tray 18 are inclined downwardly upstream to downstream in the filter web path. Filter cake 22 is forced off filter web 2 where it falls from either side of support tray 18 into a suitable collection receptacle such as a debris box 24. With substantially all of filter cake 22 separated and displaced from filter web 2, exiting filter web 26 is directed from filter web extractor 10 into a separate collection receptacle 28. As a result, filter cake 22 and exiting filter web 26 are separated into independent containers 24, 28 for efficient and environmentally safe disposal. In some cases, exiting filter web 26 can be reused thereby saving material expense.

Figure 2:
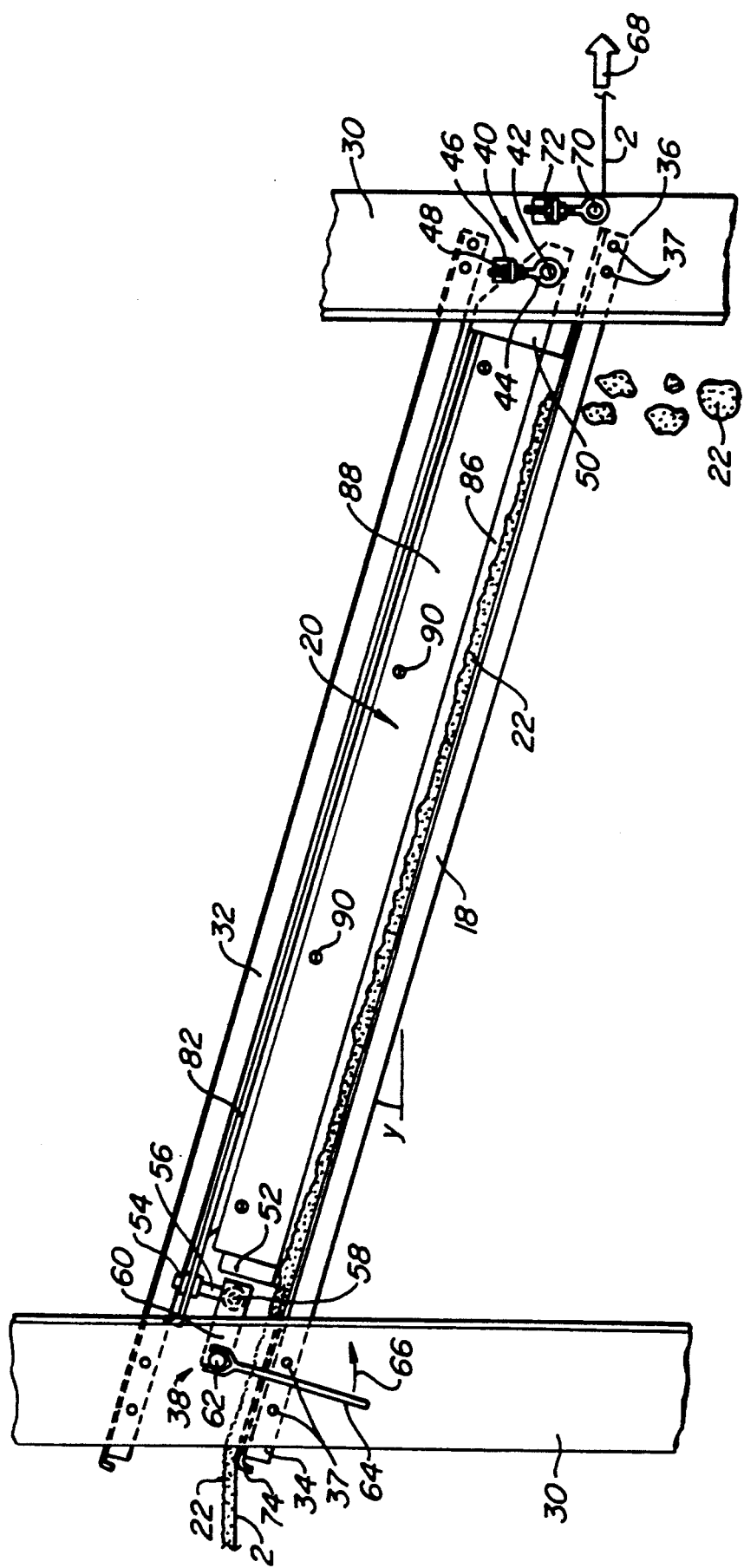
FIG. 2 is a side elevation view of the preferred embodiment of the invention illustrating filter web disposed between the plow blade and support tray.

In order to better explain the relationship between plow blade 20 and support tray 18, a side elevational view of these components are shown in FIG. 2. Referring now to FIG. 2, plow blade 20 and support tray 18 are coupled to support frame 30. Support frame 30 may take many configurations as dictated for the particular application but preferably supports support tray 18 at each corner. Although not necessary to practice the invention, it is anticipated that a plurality of plow blade 20 and support tray 18 pairs will be used in a vertically stacked arrangement to coincide with the number of filter web paths used in the particular stacked plate filter system.

For simplicity of illustration, FIG. 2 illustrates plow blade 20 with its corresponding support tray 18 along with a second support tray 32 which would be paired with an additional plow blade above second support tray 32. The distance between support tray 18 and second support tray 32 would be equal to the distance between paper web paths defined by the stack arrangement of plate filters previously described.

In the preferred embodiment, support tray 18 is secured to support frame 30 in an inclined orientation having upstream end 34 higher than downstream end 36. Support tray 18 is secured to support frame 30 using support pins 37 at either end of the tray. Support tray 18 is fixed to support frame 30 at a negative slope y of approximately 1:4. Plow blade 20 is adjustably suspended above support tray 18 in a generally parallel manner. Plow blade 20 is supported at the upstream end and downstream end by suitable height adjustment means which allow the vertical elevation of plow blade 20 relative to support tray 18 to be adjusted within a suitable range as well as lifted to allow filter web threading through the apparatus.

The plow blade adjustment means preferably includes plow nose adjustor 38 and a plow tail adjustor 40. Plow blade 20 is pivotally attached to shaft 42 at its downstream end. Shaft 42 is coupled to support frame 30 through an adjustable eye bolt suspended from steel angle 46 by nut 48. The threaded displacement of nut 48 along eye bolt 44 adjusts the suspended position of shaft 42 and thereby the position of the downstream end, or plow tail 50, of plow blade 20. In the embodiment illustrated in FIG. 2, steel angle 46 is secured on the outside of support frame 30. Plow blade is preferable wedge shaped as described below and shaft 42 extends through a slot (not shown) in support frame 30 and across the width of support tray 18 where it is suspended on the opposite side by an identical plow tail adjustor located on a parallel strut of support frame 30 and supporting the opposite side of the wedge shaped plow blade 20. As such, the displacement of plow tail 50 relative to the fixed position of support tray 18 can be adjusted and fine tuned to the particular thickness of filter web 2 used in the specific application. It is desirable to suspend plow blade 20 at an orientation that allows filter web 2 to pass between plow blade 20 and support tray 18 relatively unrestricted while maximizing the contact with filter cake 22 disposed on filter web 2.

Plow nose 52 is coupled to support frame through plow nose adjustor 38. Plow nose adjustor 38 is configured to allow both vertical height adjustment of plow blade 20 relative to support tray 18 in a manner similar to that provided by plow tail adjustor 40 described above, as well as allowing plow nose 52 to be lifted away from support tray 18 and pivoted about shaft 42 to facilitate threading of filter web 2.

Plow nose adjustor 38 includes threaded bolt adjustor 54 including eye bolt 56 and bar 58. Bar 58 is slidably retained in adjustor block 60 using a cotter pin configuration for removability, cleaning and maintenance. Adjustor block is then coupled to support frame 30 through pivot bar 62. Adjustment handle 64 is connected to pivot bar 62. Elevational adjustment of plow nose 52 is accomplished by threaded engagement of eye bolt 56 with threaded bolt adjustor 54 in a matter similar to that previously described with eye bolt 44 for plow tail elevation adjustment. Rotation of adjustment handle 64 as indicated by arrow 66 rotates pivot bar 62 and thereby communicates the rotation to adjustor block 60 which can rotate relative to eye bolt 56. Rotation of handle 64 causes bar 58 to displace upwardly away from support tray 18 forcing eye bolt 56 up and thereby lifting plow nose 52 away from support tray 18. Filter web 2 can thereby be easily threaded between plow blade 20 and support tray 18 when desired. Reverse rotation of adjustment handle 64 returns plow nose adjustor 38 into the normal position illustrated.

In operation, as filter web 2 is pulled across support tray 18 between plow blade 20 and support tray 18 in the upstream to downstream direction as indicated by arrow 68, plow blade 20 displaces filter cake 22 from filter web 2 until it is dislodged and falls off of support tray 18. Rounded flange 74 is provided at the upstream edge of support tray 18 to eliminate snags and provided a smooth transition. Support tray is preferable steel but can be any suitable rigid material. The preferred configuration of plow blade 20 provides a general plowing and scraping motion as filter web 2 passes beneath it. The specific construction of plow blade 20 is described in more detail in conjunction with FIG. 3 below.

Figure 3:
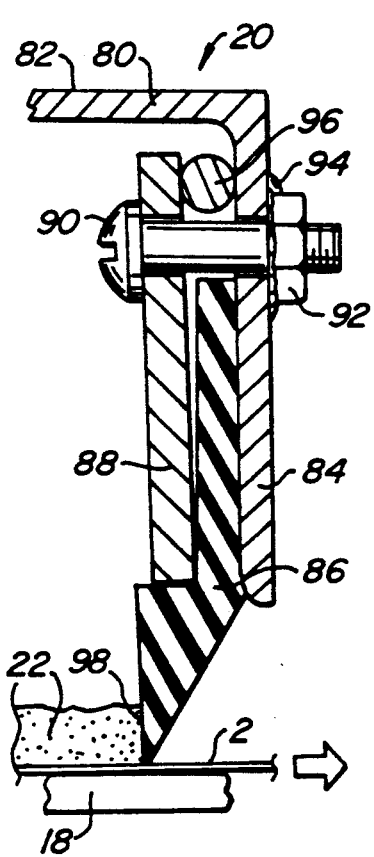
FIG. 3 is a cross-sectional view of the plow blade used in the preferred embodiment of the invention.

Referring now to FIG. 3, plow blade 20 is shown in cross section. Plough blade 20 includes body 80 preferably fabricated from angled steel, alloy or similar material and includes mounting face 82 and back plate 84 in an angled configuration. Mounting face 82 extends upstream to provide both a mounting surface for plow nose adjuster 38 as well as a deflector for filter cake 22 building up on the upstream side of plow blade 20 during operation. Resilient scrapper 86 is secured to body 80 between back plate 84 and front plate 88 and retained in position by bolt 90 and hex nut 92. Hex nut 92 is preferably bonded to back plate 84 using suitable bonding material 94 such as welding, brazing or suitable adhesive. This construction allows adjustment of the retaining force on resilient scrapper 86 between front plate 88 and back plate 84 by simple and accessible rotation of bolt 90. Rod 96, preferably made of hardened material such as steel, alloy or high durometer rubber extends across the length of front plate 88 and retains the spacing between front plate 88 and back plate 84 at the above bolt 90 allowing front plate 88 to act as a lever. Tensioning of bolt 90 thereby produces clamping pressure on resilient scrapper 86 near blade 98. This construction allows easy removal and replacement of scrapper 86 when required. Scrapper 86 is preferably fabricated from urethane; however, other suitable materials such as rubber, plastic or other resilient composites can be used.

When the height of plow blade 20 is properly adjusted above support tray 18 using plow nose adjuster 38 and plow tail adjuster 40, filter web 2 can pass between blade 98 and support tray 88 but filter cake 22 is prevented from passing under plow blade 20 in the downstream direction generally indicated by arrow 100. As filter web 2 exits downstream of support tray 18, it passes below roller bar 70. Roller bar 70 is vertically adjustable using roller bar adjustor 72 constructed in a similar manner to plow tail adjustor 40 previously described. Roller bar 70 is provided at the downstream end of support tray 18 across support tray 18 as a guide for filter web 2 and is preferably configured having concave ridges 76 to minimize travel resistance against filter web 2.

Figure 4:
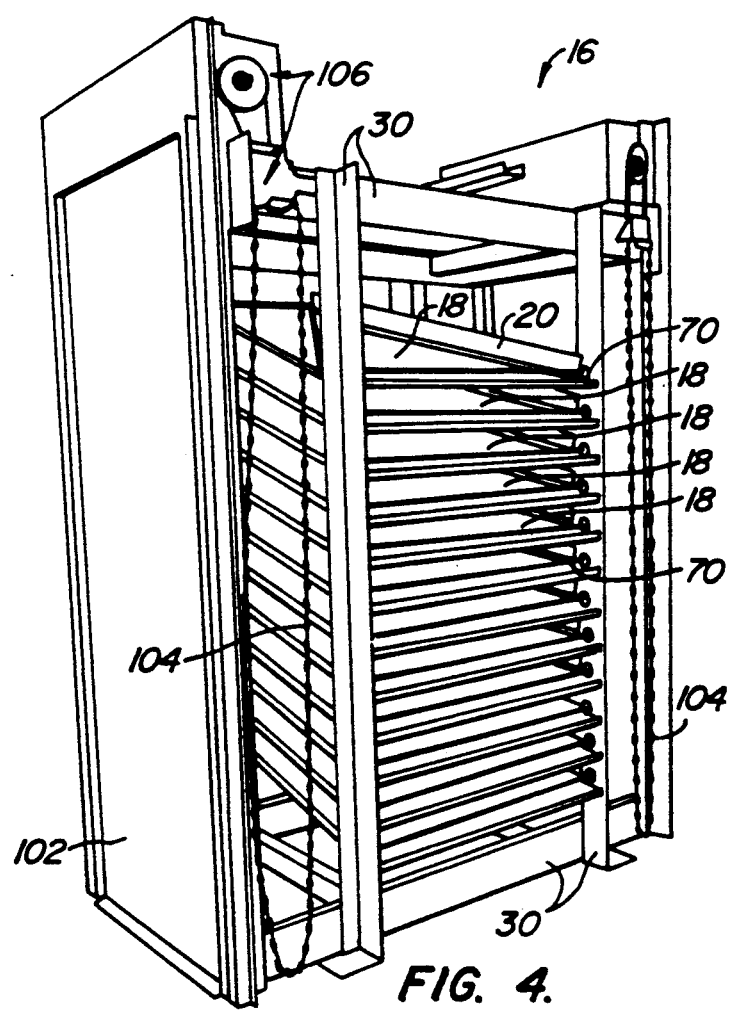
FIG. 4 is a perspective view of the preferred embodiment of the invention employed in a multiple stack arrangement.

FIG. 4 illustrates a preferred embodiment of the invention having a plurality of plow blade 20 and support tray 18 pairs disposed in a vertical arrangement and supported by support frame 30. In this embodiment, support frame 30 also supports a pair of roll-up side shields 102 which are used to deflect filter cake 22 downwardly as it exits from the sides of support tray 18. A suitable debris box or collection receptacle can be positioned at the bottom of each side of support frame 30 to catch falling filter cake. Roll-up side shield 102 is controlled by hand chain 104 through side shield roller mechanism 106. Operation of side shield roller mechanism allows roll up side shield 102 to be rolled up into housing 108 to provide access in cleaning to plow blades 20, support trays 18 and other related hardware.

Figure 5:
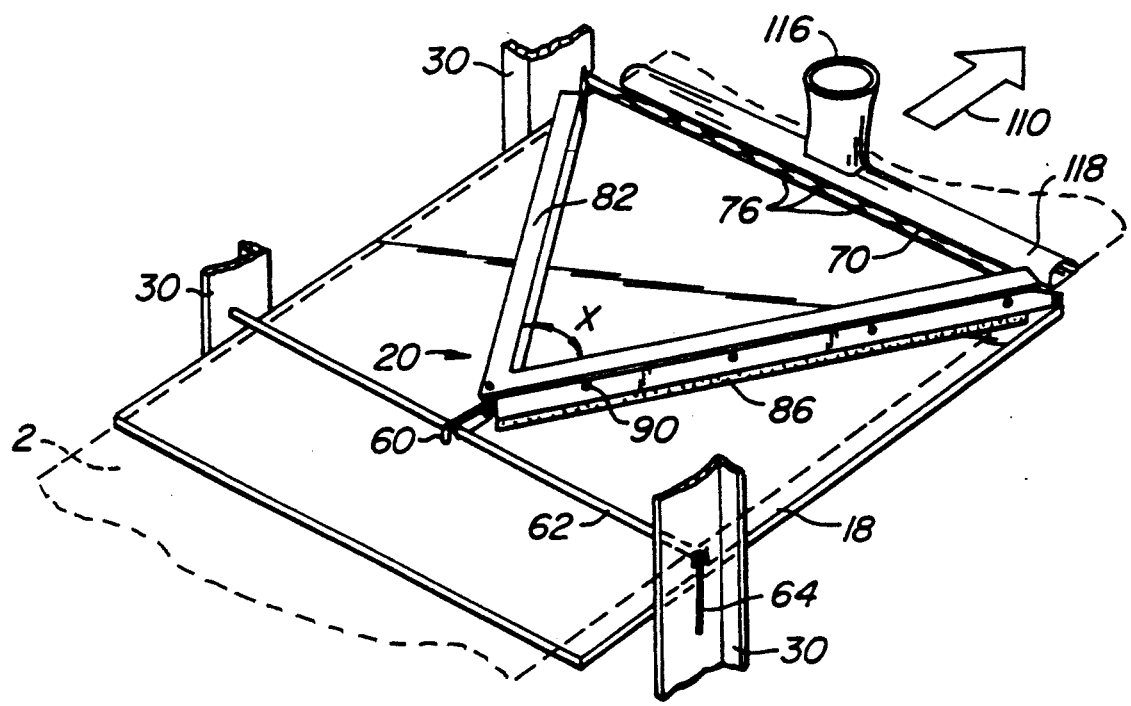
FIG. 5 is a perspective view of the support tray and the preferred embodiment of the plow blade with the filter web shown in phantom.

FIG. 5 is a simplified view of the preferred configuration of plow blade 20 in its orientation with support tray 18. Filter web 2, illustrated in phantom lines, is pulled between plow blade 20 and support tray 18 in the upstream to downstream direction indicated by arrow 110. Plow blade 20 is adjusted so that resilient scrapper 86 presses filter web 2 against support tray 18 and scrapes or "plows" the filter cake off of filter web 2. In the preferred embodiment, plow blade is configured having first leg and second leg connected together at an angle of approximately 60° in a general wedge-like configuration as illustrated in FIG. 5. Angle x is preferably 60° but can be modified for the particular embodiment. When angle x is increased, the length of first leg 112 and second leg 114 can be decreased while still covering an equal width across support tray 18. Alternatively, if angle x is decreased, first leg and second leg would have an increased length.

In one embodiment of the invention, a vacuum apparatus 116 is provided downstream of plow blade 20 having a vacuum head 118 suspended across the width of filter web 2. Preferably, vacuum head 118 is positioned downstream of roller bar 70 The application of a vacuum downstream of plow blade 20 will provide removal of any excess moisture or particulate matter still disposed upon filter web 20. Application of such a device will allow certain filter web media to be reused under some circumstances.

Figure 6:
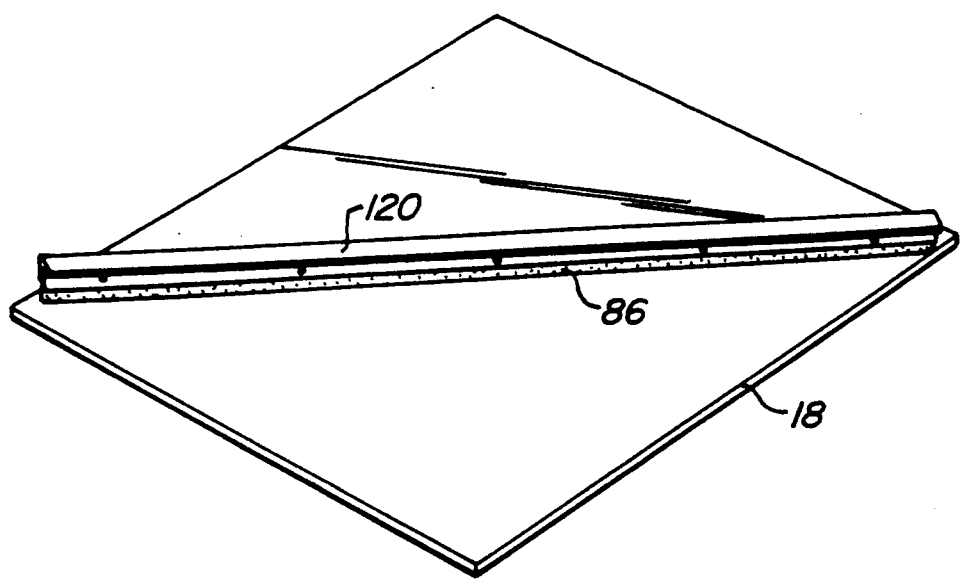
FIG. 6 is a perspective view of the support tray shown with an alternative embodiment of the plow blade.

In an alternative embodiment of the invention illustrated in FIG. 6, plow blade 120 is configured having a single leg which extends across the entire width of support tray 18 in a generally diagonal orientation. In this embodiment, the various elevation adjustment mechanisms previously described would also be employed to allow height adjustment of plow blade 120 but would be positioned at the extreme ends of plow blade 120 and coupled to the support frame.

The foregoing description of the illustrative embodiments of the invention has been presented for purposes of illustration and description. It is not intended to be exhaustive or to limit the invention to the precise form illustrated, and many modifications and variations are possible in light of the above teaching without deviating from the spirit and scope of the invention. For example, support tray 18 can be inclined at various angles and have various dimensions. Likewise, the specific means used for elevational adjustment of plow blade 20 relative to support tray 18 can be selected from a wide range of adjustment devices well known in the art. Additionally, relational adjustment between plow blade 20 and support tray 18 can be facilitated by adjustment of support tray 18 rather than plow blade 20. The apparatus disclosed has been described in operation with a role of filter web 2 having finite length, but the invention can be used with "endless" filter media such as a recirculating filter band or the like.

The embodiments described in this description are selected to best explain the principles of the invention and its practical applications to thereby enable others skilled in the art to best utilize the invention in various embodiments and with various modifications as suited to the particular purpose contemplated. It is intended that the scope of the invention be defined by the claims appended hereto.

What is claimed is:

1. A filtrate separating apparatus comprising:
   a frame forming a filter web path;
   a tray coupled to the frame and positioned in the filter web path, the tray having an upstream end, a downstream end, and laterally spaced edges extending between the upstream and downstream ends;
   a filter web supported on the tray such that it is movable from the upstream to the downstream end of the tray; and
   a plow blade disposed above the filter web and arranged for scraping filtrate therefrom, the plow blade having first and second end portions, the first end portion being adjacent one of the edges, the second end portion being adjacent the other one of the edges, the plow blade being fixed at an essentially constant distance from the upstream end of the tray such that the plow blade scrapes filtrate accumulated on the filter web when the filter web is moved beneath the plow blade toward the downstream end of the tray.

2. The apparatus of claim 1 wherein the plow blade spans the filter web path.

3. The apparatus of claim 2 wherein the plow blade includes a first leg and a second leg connected together to form a wedge.

4. The apparatus of claim 3 wherein the first leg and the second leg are connected together at an angle of generally 60 degrees.

5. The apparatus of claim 1 wherein the plow blade includes a resilient scraper extending towards the support tray.

6. The apparatus of claim 1 where the plow blade includes a first leg and a second leg which form a wedge, the plow blade further comprising resilient scrapers extending from the first leg and the second leg towards the support tray, respectively.

7. The apparatus of claim 1 wherein the support tray is coupled to the frame in an inclined position with the upstream end elevated relative to the downstream end, the apparatus configured such that when the filter web passes between the plow blade and the support tray, at least a substantial portion of the particulate matter disposed on the filter web is dislodged from the filter web and is displaced away from the filter web path by the plow blade.

8. The apparatus of claim 1 wherein the support tray is coupled to the frame with the upstream end elevated relative to the downstream end at an angle of inclination of generally between 10–40 degrees.

9. An apparatus for use with a filtration system, comprising;
   a support frame having a filter web path;
   a support tray having an upstream end and a downstream end and positioned in the filter web path in an inclined position with the upstream end elevated relative to the downstream end; and
   a plow blade disposed above the support tray such that the filter web path is generally between the plow blade and the support tray, the plow blade having a first leg and a second leg connected together at an angle of between 30-90 degrees to generally form a wedge and including resilient scrapers extending from the first leg towards the support tray and from the second leg towards the support tray, respectively;

whereby when a filter web having particulate disposed thereon is passed between the plow blade and the support tray, at least a substantial portion of the particulate is dislodged from the filter web and displaced away from the filter web path by the plow blade.

10. A method for removing filter cake from an endless filter paper, the method comprising the following steps:

providing a plate filter in a first position;
providing a paper extractor in a second position;
extending a filter web across the plate filter and into the paper extractor to form a filter web path;
providing a cake separator in a third position, the third position located between the first and second positions along the filter web path, the cake separator having an upstream end, a downstream end, a support tray, and a plow blade positioned slightly above the support tray, the plow blade having a plow surface oriented at an angle relative to the filter web path;

filtering a liquid through the plate filter so that filtrate collects on a collection side of the filter web;
advancing the filter web through the cake separator between the support tray and the plow blade by pulling the filter web with the paper extractor in the upstream to downstream direction;
dislodging the cake from the filter web with the plow blade as the filter web travels below the plow blade, the plow blade causing the cake to displace off a side of the filter web as the filter web exits the cake separator.

11. The method of claim 10 including the step of collecting displaced cake in a debris container.

12. The method of claim 11 wherein the plow blade includes a first leg and a second leg forming a generally wedged shape.

13. The method of claim 12 wherein the plow blade includes a resilient scraper facing the support tray.

14. A filtrate separating apparatus comprising:
a frame;
a tray coupled to the frame, said tray being configured to support a filter web thereon; and
a plow blade arranged above and is substantially spanning said tray to form a filter web path therebetween, said plow blade including a first leg and a second leg that are arranged to form a wedge, the plow blade further including a resilient scraper extending from each one of said legs toward said support tray.

* * * * *